United States Patent
Nikbin et al.

(10) Patent No.: US 10,920,013 B2
(45) Date of Patent: Feb. 16, 2021

(54) ALKOXYLATION PROCESS USING TUBULAR REACTOR

(71) Applicant: Dow Global Technologies LLC, Midland, MI (US)

(72) Inventors: Nima N. Nikbin, Lake Jackson, TX (US); Carlos M. Villa, Lake Jackson, TX (US); Maria Jose Nieves Remacha, Lake Jackson, TX (US); Irfan Khan, Houston, TX (US); William H. Heath, Lake Jackson, TX (US); John G. Pendergast, Jr., Pearland, TX (US); Matthias Schaefer, Philippine (NL); Anna Forlin, Vigonza (IT)

(73) Assignee: Dow Global Technologies LLC, Midland, MI (US)

(*) Notice: Subject to any disclaimer, the term of this patent is extended or adjusted under 35 U.S.C. 154(b) by 149 days.

(21) Appl. No.: 16/326,880

(22) PCT Filed: Sep. 17, 2017

(86) PCT No.: PCT/US2017/051943
§ 371 (c)(1),
(2) Date: Feb. 20, 2019

(87) PCT Pub. No.: WO2018/057438
PCT Pub. Date: Mar. 29, 2018

(65) Prior Publication Data
US 2019/0202983 A1    Jul. 4, 2019

(30) Foreign Application Priority Data
Sep. 20, 2016  (IT) .......................... 102016000094393

(51) Int. Cl.
*C08G 65/26*    (2006.01)
*B01J 19/24*    (2006.01)
*B01J 8/02*     (2006.01)

(52) U.S. Cl.
CPC ........ *C08G 65/2696* (2013.01); *B01J 8/0221* (2013.01); *B01J 8/0278* (2013.01);
(Continued)

(58) Field of Classification Search
CPC ............ C08G 65/2696; C08G 65/2663; B01J 8/0221; B01J 8/0278; B01J 19/2415;
(Continued)

(56) References Cited

U.S. PATENT DOCUMENTS 3,469,949 A    9/1969 Borst
3,959,389 A    5/1976 Kurata
(Continued)

FOREIGN PATENT DOCUMENTS

WO    1998/40414 A    9/1998
WO      01/36513 A    5/2001
(Continued)

*Primary Examiner* — William K Cheung (57) ABSTRACT

Alkylene oxides are polymerized in a tubular reactor. The alkylene oxide is continuously introduced into the tubular reactor through multiple introduction points located along the length of the tubular reactor. Monomer flow rates are increased along the length of the reactor to maintain a nearly constant concentration of unreacted alkylene oxide.

12 Claims, 5 Drawing Sheets

(52) U.S. Cl.
CPC ........... *B01J 19/242* (2013.01); *B01J 19/243* (2013.01); *B01J 19/244* (2013.01); *B01J 19/2415* (2013.01); *B01J 19/2475* (2013.01); *C08G 65/2663* (2013.01); *B01J 2208/0053* (2013.01); *B01J 2208/00088* (2013.01); *B01J 2208/00212* (2013.01); *B01J 2219/00094* (2013.01); *B01J 2219/00164* (2013.01); *B01J 2219/182* (2013.01); *B01J 2219/1923* (2013.01)

(58) Field of Classification Search
CPC ...... B01J 19/242; B01J 19/243; B01J 19/244; B01J 19/2475; B01J 2208/0012; B01J 2208/0053; B01J 2219/00094; B01J 2219/00164; B01J 2219/182; B01J 2219/1923
USPC .......................................................... 524/64
See application file for complete search history.

(56) References Cited

U.S. PATENT DOCUMENTS

| | | | |
|---|---|---|---|
| 5,689,012 A * | 11/1997 | Pazos et al. | ....... C08G 65/2696 |
| 6,410,801 B1 | 6/2002 | Hinz | |
| 6,486,361 B1 | 11/2002 | Ehlers | |
| 7,947,232 B2 | 5/2011 | Strauss | |
| 8,034,980 B2 | 10/2011 | Loeffler | |
| 2006/0183882 A1 | 8/2006 | Dexheimer | |
| 2008/0161509 A1 | 7/2008 | Ostrowski | |

FOREIGN PATENT DOCUMENTS

| | | |
|---|---|---|
| WO | 2011/075333 A | 6/2011 |
| WO | 2013/192635 A | 12/2013 |

* cited by examiner

ALKOXYLATION PROCESS USING TUBULAR REACTOR

This application is a national stage entry under 35 U.S.C. § 371 from PCT International application PCT/US2017/051943, filed Sep. 17, 2017, which claims the benefit of Italy patent application 102016000094393, filed Sep. 20, 2016, the entire contents of which are hereby incorporated by reference as if fully set forth herein.

This invention relates to a process for continuously alkoxylating an initiator compound to form a polyether, and an apparatus for performing the process.

Poly(alkylene oxide)s are produced industrially in large volumes throughout the world by polymerizing one or more cyclic ethers such as ethylene oxide, 1,2-propylene oxide, 1,2-butylene oxide and tetrahydrofuran in the presence of an initiator compound. The poly(alkylene oxides) are used as raw materials for making polyurethanes and other reaction polymers, as surfactants, as hydraulic fluids, as cooling fluids, as rheology modifiers, and for other purposes.

The poly(alkylene oxide) is tailored for the specific end-use application through specific selections of alkylene oxide (s), molecular weight and initiator. A manufacturer of poly (alkylene oxides) must be able to produce a palette of products to serve the many markets for these materials. Manufacturing equipment used to make poly(alkylene oxide)s should be capable of producing many product grades. Ideally, the equipment should allow the manufacturer to change rapidly from producing one product grade to another, with minimal product of off-specification material. The equipment also should permit, when needed, the manufacture of smaller as well as larger quantities of those product grades.

Industrially, a batch or semi-batch process is almost always used to make poly(alkylene oxide)s when the polymerization is performed in the presence of an alkali metal hydroxide polymerization catalyst (such as potassium hydroxide), because these processes form products having narrow molecular weight ranges. In continuous processes such as those conducted within a continuous stirred tank reactor (CSTR), alkali metal hydroxide-catalyzed polymerizations produce products having broad molecular weight distributions. At industrial scale, batch and semi-batch processes do not permit rapid changes from one product grade to another. Large-scale batch equipment as is needed on an industrial scale often cannot be used to make small quantities of material, as the equipment may not operate properly if only partially filled.

The main alternative to alkali metal hydroxide polymerization catalyst is a so-called double metal cyanide (DMC) catalyst complex. DMC catalysts tend to produce narrower molecular weight distributions than do alkali metal hydroxides. Because of this, DMC-catalyzed polymerizations have been performed successfully at an industrial scale in continuous stirred tank reactors (CSTRs). This allows continuous production, but CSTRs do not allow for rapid changes between products and are not amenable to making small volumes of material. In addition, the molecular weight distribution is not as narrow as can be obtained with the batch or semi-batch processes.

A continuous process performed in a tube reactor offers the prospect of rapidly switching between product grades and producing products in both large and small quantities, in each case by changing operating conditions such as the composition of the alkylene oxide feed, the initiator(s) and ratios of raw materials. Processes for making poly(alkylene oxide)s in a tubular reactor have been described with respect to polymerizations that employ each of the two main classes of alkylene oxide polymerization catalysts, i.e., alkali metal hydroxides such as potassium hydroxide and the DMC catalysts. See, for example, U.S. Pat. Nos. 5,689,012 and 6,410,801. In these tubular reactors, the alkylene oxide is introduced through a small number of injection points spaced along the length of the reactor.

Very significant practical problems have prevented the industrial implementation of alkoxylations in tubular reactors. Long reactor lengths and/or low linear flow rates have been needed, especially when making higher molecular weight products. This leads to very substantial capital and operating costs. When a double metal cyanide catalyst is used, the reaction rate in the beginning sections of the reactor (i.e., near the inlet end of the tubular reactor) tends to be very slow because high concentrations of hydroxyl groups that are typically seen there inhibit the catalyst. This can be overcome by diluting the initiator with, for example, recycled product of the polymerization, but doing so increases the reactor volume that is needed, which again increases capital and operating costs.

One way of reducing the capital costs for a continuous tubular reactor is to design it as a loop reactor. However, such a loop reactor is in many ways similar to a CSTR, because product and partially polymerized material is constantly being recycled to the beginning of the loop reactor and being mixed with fresh material. This is tantamount to back-mixing as is seen in CSTR reactors, and leads to a broadening of the molecular weight distribution.

What is desired is an economical and efficient continuous process for making poly(alkylene oxide)s. The poly(alkylene oxide)s so produced preferably have narrow molecular weight distributions. Such a process preferably is capable of producing a wide spectrum of poly(alkylene oxide) products, in amounts ranging from small to very large, with minimal production of off-specification material. The process preferably can be used even with DMC catalyst complexes. Preferably, the process permits the manufacture of block copolymers by the sequential polymerization of 1,2-propylene oxide (PO) and ethylene oxide to form ethylene oxide-capped polyethers.

This invention is a process for manufacturing a polyether by polymerizing at least one alkylene oxide in a tubular reactor, wherein the tubular reactor includes a monomer feed section having a length defined by an inlet end and an outlet end, wherein an initiator composition containing at least one initiator compound and an alkylene oxide polymerization catalyst is continuously introduced into said inlet end, at least one alkylene oxide is continuously introduced into said monomer feed section under polymerization conditions through multiple alkylene oxide ports arranged along the length of said monomer feed section to form a reaction mixture in the monomer feed section of the tubular reactor, the alkylene oxide polymerizes onto the initiator compound in the monomer feed section of the tubular reactor to form the polyether and the polyether is continuously withdrawn from the outlet end of the monomer feed section of the tubular reactor, the process being further characterized in that the concentration of unreacted alkylene oxide is maintained in the range 0.25 to 12 weight percent at each point along the length of the monomer feed section of the tubular reactor from the first alkylene oxide port until the earlier of the last alkylene oxide port or a point of deactivation of the catalyst within the monomer feed section.

Figure 1:
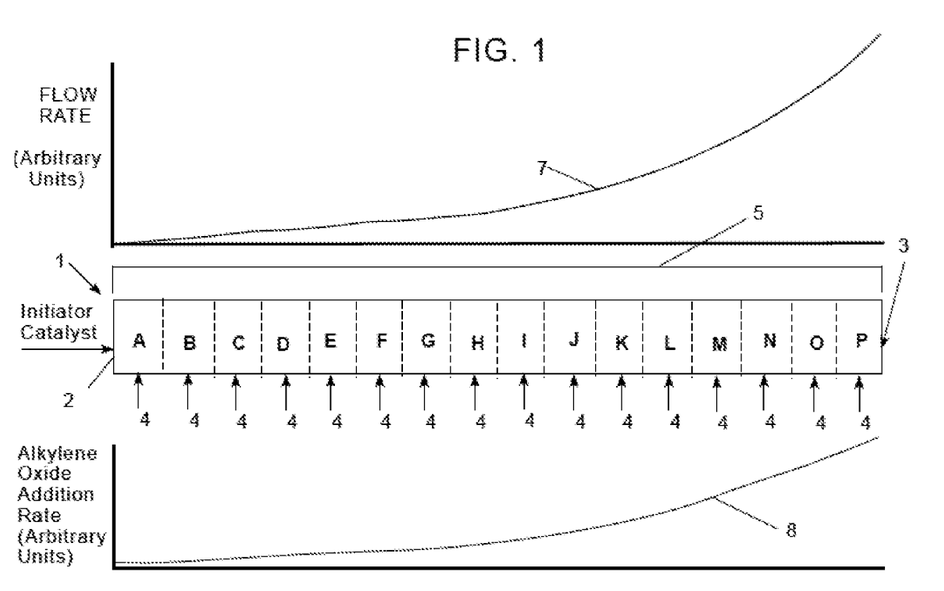
FIG. 1 is a schematic view of a tubular reactor for use in the invention, together with graphical representations of the rate of alkylene oxide addition and flow rates along the length of the tubular reactor.

Turning to FIG. 1, tubular reactor 1 includes inlet end 2 and outlet end 3. Multiple alkylene oxide ports 4 are arranged along the length of tubular reactor 1 from inlet end 2 to outlet end 3. In the embodiment shown, the entire length of tubular reactor 1 is made up of a single monomer feed section 5. A monomer feed section, for purposes of this invention, is a contiguous section of the tubular reactor in which the same alkylene oxide composition is introduced through multiple alkylene oxide ports. The length of any monomer feed section is the distance from the first to the last alkylene oxide port in such contiguous section.

In FIG. 1, monomer feed section 5 is arbitrarily divided into 16 equal-length portions sequentially identified as A through P, each of which contains at least one alkylene oxide port 4. These portions are identified in FIG. 1 for purposes of illustration only, and do not necessarily correspond to any physical structure. As shown, each of portions A-P is arbitrarily shown as including a single alkylene oxide port 4, and the alkylene oxide ports 4 are arbitrarily shown as being equally spaced along the length of monomer feed section 5. As discussed more fully below, the number of alkylene oxide ports 4 and their spacing typically will vary along the length of monomer feed section 5 from inlet end 2 to outlet end 3.

During operation, an initiator composition is continuously introduced into inlet end 2 of tubular reactor 1 and passed through monomer feed section 5 toward outlet end 3. The initiator composition contains at least one initiator compound and at least one alkylene oxide polymerization catalyst. The initiator composition also may contain other ingredients as described further below. The components of the initiator composition may be added all together as a mixture, or may be introduced individually into tubular reactor 1, upstream of the first alkylene oxide port 4.

For purposes of this invention, the "inlet end" of tubular reactor 1 includes the entire length of tubular reactor 1 upstream of the first alkylene oxide port 4 in the first monomer feed section 5. "Upstream" refers to the direction counter to the direction of main flow of materials through tubular reactor 1, i.e., toward the inlet of the tubular reactor (such as inlet 2 in cases in which monomer feed section 5 is the first section of tubular reactor 1), whereas "downstream" conversely refers to the direction of main flow of materials, i.e., toward the outlet of the tubular reactor (such as outlet end 3 in cases in which monomer feed section 5 is the only or last section of tubular reactor 1).

Alkylene oxide is introduced into monomer feed section 5 through alkylene oxide ports 4. The alkylene oxide is introduced under polymerization conditions, by which it is meant that conditions within monomer feed section 5 of tubular reactor 1 are such that polymerization of the alkylene oxide onto the initiator takes place. Those conditions include, for example, the presence of a catalytically effective amount of the alkylene oxide polymerization catalyst, an elevated temperature, and a superatmospheric pressure to maintain the alkylene oxide as a subcooled liquid. The temperature may be, for example, 100 to 180° C., 120 to 180° C., 130 to 170° C. or 130 to 160° C. The pressure may be, for example 120 kPa to 10 MPa or more. Heating and/or cooling can be applied to monomer feed section 5 as necessary to maintain the polymerization temperature.

Alkylene oxide ports 4 are openings through which the alkylene oxide is introduced into monomer feed section 5. In simple embodiments, ports 4 are simply holes extending into the interior of monomer feed section 5, which establish fluid communication between monomer feed section 5 and an external source of the alkylene oxide. Ports 4 may alternatively include valving and/or metering means, if desired.

Ports 4 may be supplied from a common source of alkylene oxide if desired.

Ports 4 may be divided into different groups, each of which groups is supplied from its own source of alkylene oxide. For example, each of portions A-P of monomer feed section 5 may have its own alkylene oxide source, which feeds the port(s) in that section. Such an arrangement allows different alkylene oxide compositions to be fed in the various portions, to produce, for example, block copolymers, and effectively dividing monomer feed section 5 into multiple monomer fees sections. This arrangement also permits the alkylene oxide feed to some portions of monomer feed section 5 to be shut off completely, which ability permits products of varying molecular weight to be produced in a single apparatus.

Alternatively, each of ports 4 may be supplied with alkylene oxide individually.

Alkylene oxide is supplied through ports 4 at rates such that the concentration of unreacted alkylene oxide (URO) is maintained in the range 0.25 to 12 weight percent at each point along the length of monomer feed section 5 of tubular reactor 1 from the first alkylene oxide port 4 until the earlier of the last alkylene oxide port 4 or a point of deactivation of the catalyst within monomer feed section 5. The concentration at any point of the length of monomer feed section is for purposes of this invention the average concentration of alkylene oxide across the entire cross-section (i.e., transverse to the main direction of flow) of monomer feed section 5 at such point.

Figure 2:
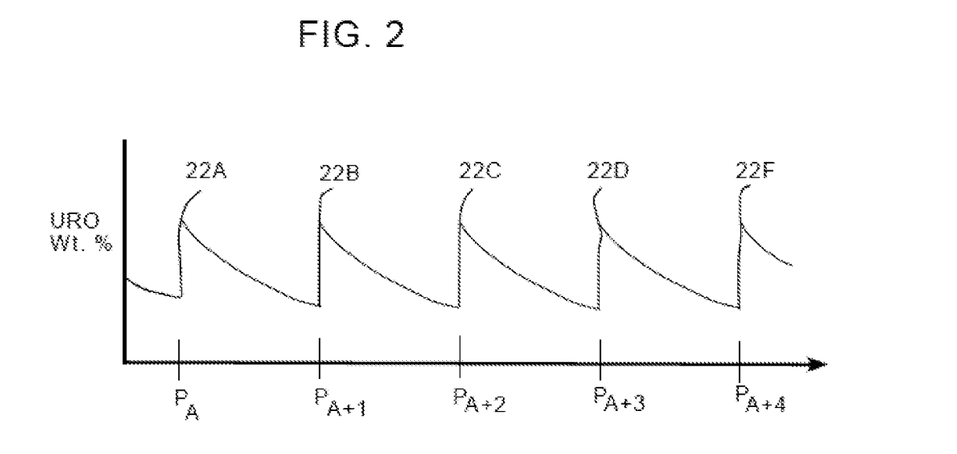
FIG. 2 is a graphical representation of the variation of unreacted alkylene oxide (URO) content in portion of the monomer feed section of a tubular reactor in a representative process of the invention.

The URO reaches peak values at the positions of alkylene oxide ports 4, and from such peak values falls in the downstream direction as the alkylene oxide polymerizes, reaching a minimum just before the next sequential alkylene oxide port 4, as illustrated in FIG. 2. In FIG. 2, the horizontal axis indicates linear positions along the length of such portion of monomer feed section, including five successive alkylene oxide ports $P_A$, $P_{A+1}$, $P_{A+2}$, $P_{A+3}$ and $P_{A+4}$, respectively. The vertical axis is URO in arbitrary units. Line 21 represents the URO along the length of such portion of the monomer feed section. As shown in FIG. 2, the URO reaches local maxima 22A, 22B, 22C, 22D and 22F at the location of each alkylene oxide port. As the reaction mixture proceeds through monomer feed section 5 and the alkylene oxide polymerizes, the URO falls, reaching local minima 23A, 23B, 23C and 23D just upstream of each alkylene oxide port, where the alkylene oxide is replenished and the URO again reaches a local maximum.

The values of local URO maxima such as local maxima 22A, 22B, 22C, 22D and 22F in FIG. 2 are controlled by the amount of alkylene oxide introduced at each alkylene oxide port such as alkylene oxide ports $P_A$, $P_{A+1}$, $P_{A+2}$, $P_{A+3}$ and $P_{A+4}$ in FIG. 2. In embodiments such as illustrated in FIG. 2, all local maxima such as local maxima 22A, 22B, 22C, 22D and 22F all have the same value, i.e. sufficient alkylene oxide is introduced at each alkylene oxide port to restore the URO to the same value. In other embodiments, the values of the local maxima may be different from each other. In particular, it may be beneficial to produce higher URO maximum values near inlet end 2 of monomer feed section 5 and somewhat lower URO maximum values in later portions of monomer feed section. This has the advantage, for example, of accelerating the initiation of polymerization near inlet end 2 of monomer feed section 5, which is quite beneficial especially when the catalyst is a double metal cyanide catalyst complex, which often performs sluggishly in the presence of high concentrations of hydroxyl groups, which is often the case near inlet end 2 of monomer feed section 5. Once polymerization has been initiated, lower URO maximum values may be sufficient to provide a commercially reasonable polymerization rate.

The alkylene oxide is introduced at the various alkylene oxide ports such that the URO at any point along the length of monomer feed section (the "maximum URO") is no greater than 12% by weight of the reaction mixture. The maximum URO may be no greater than 10%, no greater than 8%, no greater than 6%, or no greater than any arbitrarily lower value. Because faster polymerization often is obtained at higher URO values, the maximum URO may be at least 1%, at least 2%, at least 4%, at least 5%, at least 6%, at least 8% or at least 10%.

The values of local URO minima such as local minima 23A, 23B, 23C and 23D in FIG. 2 are determined by the polymerization rate and the time required for the reaction mixture to travel from one alkylene oxide port to the next successive port. Generally speaking, at any given polymerization rate, the longer it takes for the reaction mixture to travel from an alkylene oxide port to the next successive one, the lower will be the value of the local URO minimum. Through selection of flow rates and the spacing of the alkylene oxide ports, the process may be operated such that all local minima such as local minima 23A, 23B, 23C and 23D all have the same value. In other embodiments, the values of the local minima may not all be the same and may all be different from each other.

In general, the URO is maintained at 0.25 to 12 weight percent at each point along the length of the monomer feed section from the first to the last alkylene oxide injection port (or point of inactivation of the catalyst, if any). Accordingly, local minima such as local minima 23A, 23B, 23C and 23D in FIG. 2 have values of at least 0.25 weight percent. The values of the local minima may be, for example, at least 1, at least 2, at least 3, at least 4, at least 5, at least 6, at least 7, at least 8 weight percent.

To maintain fast polymerization rates, it is preferred to avoid large swings in URO along the length of monomer feed section 5 from the first to the last alkylene oxide ports. Accordingly, in some embodiments, each local minimum of URO may have a value that is at least 25%, at least 40%, at least 50%, at least 60% or at least 75% of the value of the immediately preceding local maximum, that is, the URO value at the immediately preceding alkylene oxide port. Small variations between adjacent local maxima and minima are favored when the time for the reaction mixture to pass from one alkylene oxide port to the next is small, due to high linear flow rates and/or close spacing of adjacent alkylene oxide ports.

The addition of alkylene oxide at the various alkylene oxide ports increases the mass of the reaction mixture. If monomer feed section 5 of tubular reactor 2 has a constant cross-sectional area (or does not increase in proportion of the increasing mass flow rate), this results in an increase in linear flow rates as the reaction mixture progresses along the length of monomer feed section 5. In FIG. 1, this is represented graphically by line 7, which indicates a representative linear flow rate, in arbitrary units, at each point along the length of monomer feed section 5 of tubular reactor 2. The flow rate at any point p along the length of monomer feed section 5 can be estimated from the flow rate of the initiator composition at inlet end 2 according to the relationship $$F_p \approx \frac{M_p}{M_i} \times F_i$$

where $F_p$ is the flow rate at point p, $F_i$ is the flow rate of the initiator composition at inlet end 2, $M_p$ is the total mass introduced to the monomer feed section 5 at or upstream of point p, and $M_i$ is the mass of the initiator composition. The flow rate at outlet end of monomer feed section 5, assuming constant cross-sectional area, can be estimated from the flow rate of the initiator composition at inlet end 2 according to the relationship $$F_f \approx \frac{MN_f}{MN_i} \times F_i$$

where $F_f$ is the flow rate at outlet end 3 of monomer feed section 5, $F_i$ is the flow rate of the initiator composition at inlet end 2, $MN_f$ is the number average molecular weight of the product polyether taken from outlet end 3, and $MN_i$ is the number average molecular weight of the initiator composition, excluding catalyst and any promoter(s) (as described below) that may be present.

Because the mass of the reaction mixture increases as more alkylene oxide is added along the length of monomer feed section 5, and the alkylene oxide is continuously being polymerized, increasingly greater quantities of the alkylene oxide need to be added to the reaction mixture as it travels along the length of monomer feed section 5 to maintain a given URO level. Adding the alkylene oxide at greater rates in downstream portions of monomer feed section 5 than in more upstream portions is preferred to avoid having excessively long reactor lengths. In some cases, such as when a double metal cyanide catalyst complex is used as the alkoxylation catalyst, the rate of polymerization tends to increase as the molecular weight of the polyether increases along the length of monomer feed section 5.

Thus, in preferred embodiments, the rate at which alkylene oxide is introduced in downstream portions of monomer feed section 5 becomes intermittently or continuously greater as the reaction mixture traverses along the length of monomer feed section 5 from the first alkylene oxide injection port 4 to the last alkylene oxide injection port 4. This is illustrated graphically by line 8 of FIG. 1, which indicates the alkylene oxide addition rate, in arbitrary units, at each point along the length of monomer feed section 5 of tubular reactor 2. In the particular case illustrated, the rate of alkylene oxide addition increases approximately exponentially along the length of monomer feed section 5 from the first to the last alkylene oxide port.

Introducing large quantities of alkylene oxide through a single port will create very high localized alkylene oxide concentrations. For that reason, a preferred approach for adding the alkylene oxide is to increase port density intermittently or continuously along the length of monomer feed section 5, so that more ports per unit length of monomer feed section 5 are present in downstream portions of monomer feed section 5 than in more upstream sections. Therefore, although FIG. 1 shows for purposes of simplicity a single alkylene oxide port 4 in each of portions A-P of monomer feed section 5, in preferred embodiments the number of alkylene oxide ports per unit length of monomer feed section 5 will increase step-wise or continuously along the length of monomer feed section 5 in a downstream direction. The number of alkylene ports may increase in proportion with the increasing rate of addition of alkylene oxide along the length of monomer feed section 5 in a downstream direction.

Figure 3:
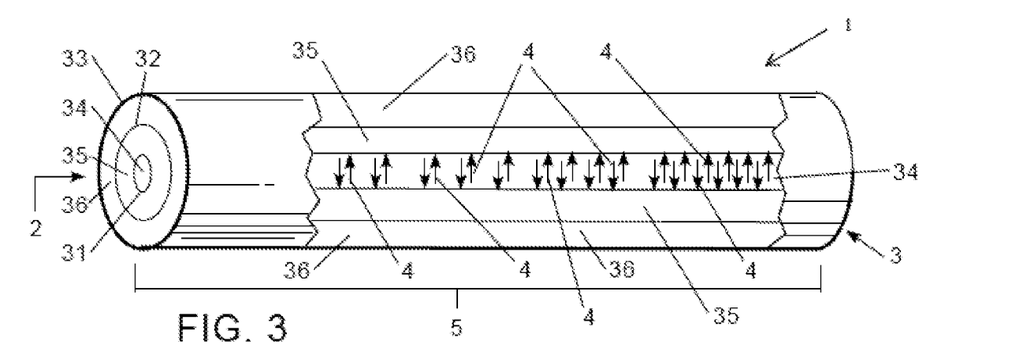
FIG. 3 is a front view, partially in section, of an embodiment of a tubular reactor for use in the invention.

This increasing port density is illustrated in FIG. 3. FIG. 3 shows an embodiment of monomer feed section 5 of a tubular reactor 1. This embodiment includes three concentric tubes 31, 32 and 33, which define channels 34, 35 and 36. The reaction takes places in middle channel 35. The initiator composition is fed into middle channel 35 at inlet end 2 of monomer feed section 5. Alkylene oxide is fed into innermost channel 34 from either inlet end 2 or outlet end 3 of monomer feed section 5 (or both, or at one or more intermediate points not shown). A thermal fluid is fed into outermost channel 36 from either or both ends and/or from one or more intermediate points not shown. Alkylene oxide is introduced into middle channel 35 via a multiplicity of alkylene oxide ports 4 that establish fluid communication between innermost channel 34 and middle channel 35. The port density, i.e., the number of ports per unit length of monomer feed section 5, increases towards outlet end 3 of monomer feed section 5. A positive pressure (relative to that in middle channel 35) is established in innermost channel 34 so the alkylene oxide flows from innermost channel 34 to middle channel 35.

Figure 6:
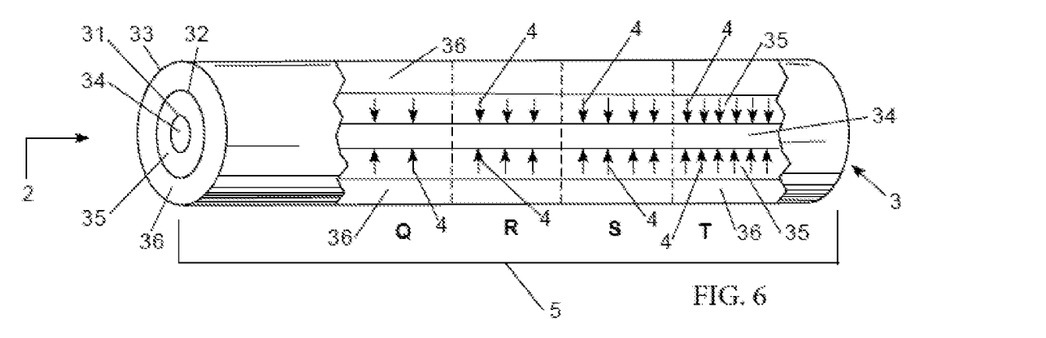
FIG. 6 is a front view, partially in section, of a fourth embodiment of a tubular reactor for use in the invention.

The port density may be increased incrementally rather than continuously along the length of monomer feed section 5, as illustrated in FIG. 6. Reference numerals indicate features as identified by like reference numerals with respect to FIG. 3. In FIG. 6, monomer feed section 5 is divided into sequential subsections, four of which are indicated as Q, R, S and T. As shown, the density of alkylene oxide ports 4 increases from Q to R, from R to S and from S to T. Thus, during operation, the flow rate of alkylene oxide increases step-wise through those four subsections. The number of subsections shown and the number of alkylene oxide ports shown in each of subsections Q, R, S and T, have been selected arbitrarily for purposes of illustration. More or fewer such subsections may be present, and the number of alkylene oxide ports within each section may be greater or fewer, as desired. The arrangement shown in FIG. 6 lends itself well to modular construction, in which each subsection is manufactured individually and then assembled to form the tubular reactor.

The port density (ports per unit length of monomer feed section 5) may increase, for example, by a factor of at least 2, at least 3, at least 5, or at least 10 along the length of monomer feed section 5 from the first to the last alkylene oxide port. The port density may increase by a factor of up to 200, up to 100 or up to 50.

The total number of alkylene oxide ports in monomer feed section 5 may be, for example, at least 20, at least 50, or at least 100, and may be up to 100,000 or more, up to 50,000, up to 10,000 or up to 5000.

The alkylene oxide ports may introduce the alkylene oxide concurrently to or countercurrently to, to the direction of flow of the reaction mixture through monomer feed section 5. An inert gas such as nitrogen or argon may be introduced with the alkylene oxide at some or all of the alkylene oxide ports, or at other ports dedicated to such purpose, to provide local turbulence and thereby facilitate rapid mixing of the alkylene oxide into the reaction mixture. Monomer feed section 5 may contain internal structures such as baffles that function as static mixing elements, or other mixing elements, if desired for the same reason.

The dimensions of monomer feed section 5 of tubular reactor 1 may vary substantially depending on the desired design capacity and needed residence time, and factors such as the ability to supply heat to and/or remove heat from monomer feed section 5, the molecular weight of the product, the particular catalyst, among others. The cross-sectional area of monomer feed section 5 may be, for example, at least 0.01 m$^2$, at least 0.05 m$^2$, at least 0.1 m$^2$ or at least 0.2 m$^2$, up to 1 m$^2$, 0.75 m$^2$, or up to 0.5 m$^2$. The length of monomer feed section 5 may be, for example, at least 1 meter, at least 5 meters, at least 10 meters, at least 25 meters, at least 50 meters or at least 75 meters, up to 1000 meters, up to 500 meters, up to 250 meters or up to 150 meters.

As the alkylene oxide polymerization is generally exothermic, cooling is usually needed to maintain the polymerization temperature. Heating may be required in some cases, particularly near inlet 2 of monomer feed section 5, where the polymerization reaction may be sluggish. Therefore, tubular reactor 1 will generally include means for supplying and/or removing heat from monomer feed section 5. In FIG. 3, such means includes outermost channel 36, through which a thermal fluid flows in contact with an exterior surface of monomer feed section 5 during operation, to supply and/or remove heat from monomer feed section 5. The thermal fluid may flow in a countercurrent direction, i.e., opposite of direction of the main flow of material through monomer feed section 5. In this way, the thermal fluid can remove heat from downstream portions of monomer feed section 5, where rapid polymerization releases heat, and the heated thermal fluid then can, if necessary, supply heat to more upstream portions of monomer feed section 5, where little exothermic heat of reaction might be produced.

An advantage of this invention is that cooling costs, i.e., the costs of removing exothermic heat of reaction from the tubular reactor, are often significantly less than seen when using conventional batch reactors or continuous stirred tank reactors. Cooling costs often constitute a significant fraction of the variable manufacturing costs of operating a polyether manufacturing plant. The ability to reduce these costs is an important benefit of the invention.

As shown in FIG. 3, outermost channel 36 provides a thermal fluid along the entire length of monomer feed section 5. Heating and/or cooling instead may be provided onto to selected portions of monomer feed section 5 where needed. In FIG. 3, outermost channel 3 contacts the thermal fluid with all exterior surfaces of polymerization channel 5. Again this is not necessary, and alternative geometries can be used.

Figure 4:
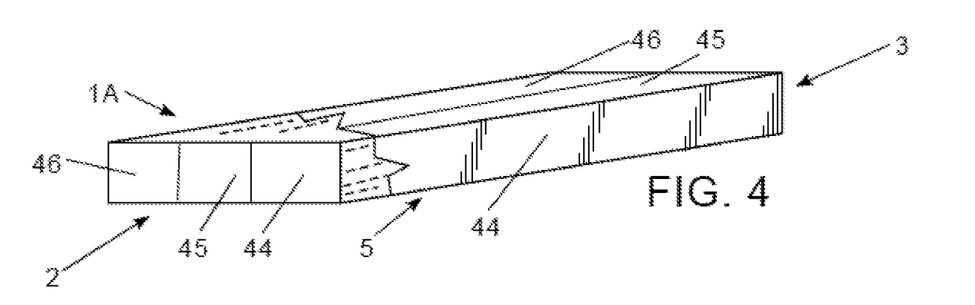
FIG. 4 is a front view, partially in section, of a second embodiment of a tubular reactor for use in the invention.

An example of such an alternative geometry is shown in FIG. 4. In FIG. 4, monomer feed section 5 of tubular reactor 1 of the invention includes alkylene oxide supply channel 44, reaction zone channel 45 and thermal fluid supply channel 46. The respective channels 44, 45 and 46 are arranged in a side-by-side manner with only a portion of the exterior of reaction zone channel 45 in contact with thermal fluid supply channel 46. Alkylene oxide is supplied from alkylene oxide supply channel 44 to reaction zone channel 45 via ports 4 as before.

Figure 7:
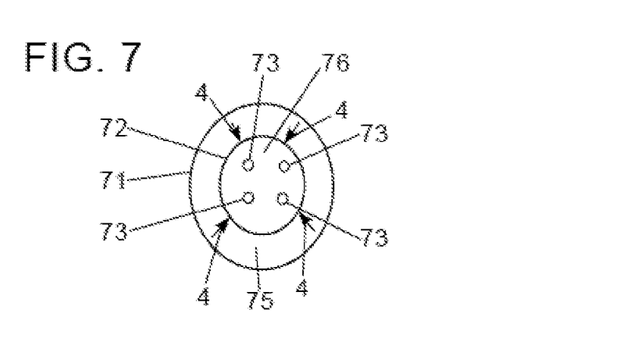
FIG. 7 is a cross-sectional view of a fifth embodiment of a tubular reactor for use in the invention.

Other geometries are suitable as well. Another example of a suitable geometry is shown in FIG. 7. In FIG. 7, outermost tube 71 and center tube 72 together define outer channel 75. Center tube 72 defines central channel 76. Tubes 73 are disposed within central channel 76. The reaction takes places in central channel 76. The initiator composition is fed into central channel 76 at the inlet end of the monomer feed section. Alkylene oxide is fed into outer channel 76 from either the inlet end 2 or the outlet end 3 of the monomer feed section (or both, or at one or more intermediate points not shown). A thermal fluid is fed through tubes 73 from either or both ends and/or from one or more intermediate points not shown. Alkylene oxide is introduced from outer channel 75 into central channel 76 via a multiplicity of alkylene oxide ports that establish fluid communication between outer channel 75 and central channel 76. A positive pressure (relative to that in central channel 76) is established in outer channel 75 so the alkylene oxide flows from outer channel 75 to central channel 76.

Monomer feed section 5 may constitute the entire length of tubular reactor 1. Alternatively, tubular reactor 1 may be divided into two or more sections, as shown, for example, in FIG. 5.

Figure 5:
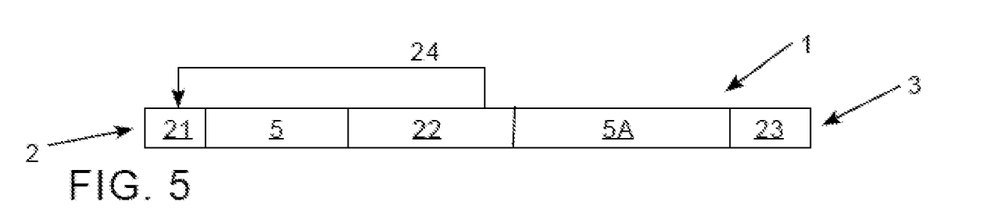
FIG. 5 is a side view of a third embodiment of a tubular reactor for use in the invention.

As shown in FIG. 5, tubular reactor 1 may include an optional preliminary section 21 upstream of any monomer feed section, such as monomer feed section 5 in FIG. 5, where, for example, the components of the initiator composition may be introduced, mixed and/or brought to temperature before being contacted with alkylene oxide, and/or the catalyst becomes activated. Typically, no alkylene oxide is introduced into such a preliminary section, with the beginning of the subsequent monomer feed section being indicated by the location of the first alkylene oxide port 4.

A digestion section may be present after any or each monomer feed section 5. In FIG. 5, two such digestion sections are shown, one (indicated by reference numeral 22) downstream of monomer feed section 5 and another (indicated by reference numeral 23) downstream of monomer feed section 5A. Typically, no alkylene oxide is introduced in such a digestion section, but polymerization conditions are maintained. This permits unreacted alkylene oxide to polymerize further, to complete the polymerization and reduce the URO to very low levels in the product or an intermediate product formed in any monomer feed section upstream of the last monomer feed section in the tubular reactor.

One or more finishing sections may be present in the tubular reactor, where, for example, impurities are removed, the alkylene oxide polymerization catalyst is deactivated and/or removed, additives such as antioxidants are added, and the like.

Tubular reactor 1 may contain multiple monomer feed sections. Sequential monomer feed sections may be contiguous, or separated by one or more other sections, as shown in FIG. 5. If contiguous, a higher flow rate of alkylene oxide may be established in each succeeding monomer feed section. In the embodiment shown in FIG. 5, two monomer feed sections 5 and 5A are present, although any larger number, such as at least 3 or at least 5 to as many as 10, of monomer feed sections may be present. Multiple monomer feed sections are useful for producing block copolymers, in which a first alkylene oxide or alkylene oxide mixture is polymerized in a first monomer feed section, and different alkylene oxides or alkylene oxide mixtures are polymerized in one or more downstream sections.

Figure 8:
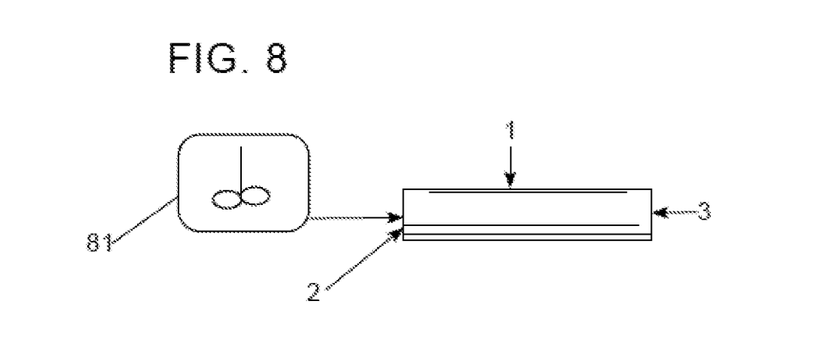
FIG. 8 is a schematic view of a polymerization apparatus for use in the invention.

In a specific embodiment, the polymerization of the polyether is performed in stages, as illustrated in FIG. 8. A first polymerization stage in performed in a batch reactor or a continuous stirred tank reactor 81. This produces an intermediate polyether product that is fed into inlet end 2 of tubular reactor 1 of the invention. Additional alkylene oxide is polymerized onto the intermediate polyether product in tubular reactor 1 to form a higher molecular weight product, which is removed from outlet end 3.

The alkylene oxide in each polymerization stage may be, for example, one or more of ethylene oxide, 1,2-propylene oxide, 1,2-butylene oxide, 2,3-butylene oxide, styrene oxide, 1,2-hexylene oxide, tetrahydrofuran or other cyclic ether, or a mixture of any two or more thereof.

In specific embodiments, 1,2-propylene oxide by itself or a mixture of 50-99.9 weight percent and correspondingly 0.1 to 50 weight percent ethylene oxide is fed into and polymerized in a first monomer feed section, and ethylene oxide by itself or a mixture of alkylene oxides containing greater than 50 weight-%, preferably at least 90 weight-%, ethylene oxide is polymerized in a subsequent section. Such a process can produce an ethylene-oxide capped polypropylene oxide), which is a type of polyether polyol used in large quantities to make polyurethane flexible foams and elastomers.

The initiator composition contains at least one initiator compound that contains one or more oxyalkylatable sites, i.e., sites to which an alkylene oxide can add. The function of the initiator compound(s) is to define the functionality (number of hydroxyl groups per molecule) of the product and to control molecular weight.

The initiator can have as few as one and as many as eight or more oxyalkylatable sites per molecule. For most polyurethane applications, preferred initiators have 2 to 6, more preferably 2 to 4 and especially 2 to 3 oxyalkylatable sites. Examples of oxyalkylatable sites are hydroxyl groups and amine hydrogens. The initiator, therefore, is in some embodiments a compound having one or more primary amino groups, one or more secondary amino groups, one or more hydroxyl groups, or a mixture of any two or more such groups.

The initiator can have an equivalent weight per oxyalkylatable site from 9 to 6000 grams/mole or more, but has a molecular weight less than that of the product. It is generally preferred that the initiator is a liquid under the conditions of the polymerization reaction. For making polyurethanes, a preferred equivalent weight for the initiator is about 20 to 2000, more preferably about 25 to 500 and still more preferably about 25 to 125 grams/mole.

Examples of initiator compounds include methanol, ethanol, 1-propanol, 2-propanol, n-butanol, sec-butanol, t-butanol, 1-pentanol, 1-hexanol, ethylene glycol, 1-2-propane diol, 1,3-propane diol, 1,4-butane diol, 1,6-hexane diol, diethylene glycol, triethylene glycol, dipropylene glycol, tripropylene glycol, glycerin, trimethylolpropane, trimethylolethane, penterythritol, erythritol, sorbitol, sucrose, mannitol, phenol and polyphenolic initiators such as bisphenol A or 1,1,1-tris(hydroxyphenyl)ethane, ethylene diamine, propylene diamine, toluene diamine, diethyltoluene diamine, methyl amine, ethyl amine, n-propyl amine, n-butyl amine, 2-propylamine, t-butyl amine, sec-butylamine, piperazine, methylene bis(cyclohexylamine), hexamethylenediamine, diethanolamine, monoethanolamine, monoisopropanolamine, and the like. as well as alkoxylates of any of the foregoing. Such alkoxylates preferably have hydroxyl equivalent weights up to 500 and more preferably up to 125 grams/mole.

The initiator composition includes an alkylene oxide polymerization catalyst. This catalyst may be, for example, a strong base such as an alkali metal hydroxide, an alkali metal alkoxide, an alkaline earth hydroxide, an alkaline earth alkoxide, certain amine, ammonium, phosphine or phosphonium compounds. Among these, alkali metal hydroxides such as sodium hydroxide, cesium hydroxide and, especially, potassium hydroxide, are preferred.

The alkylene oxide polymerization catalyst may be a double metal cyanide catalyst. Suitable double metal cyanide catalysts include those described, for example, in U.S. Pat. Nos. 3,278,457, 3,278,458, 3,278,459, 3,404,109, 3,427,256, 3,427,334, 3,427,335 and 5,470,813. Some suitable DMC catalysts can be represented by the formula $$M_b[M^1(CN)_r(X)_t]_c[M^2(X)_6]_d \cdot nM^3_xA_y$$

wherein M and $M^3$ are each metals; $M^1$ is a transition metal different from M, each X represents a group other than cyanide that coordinates with the $M^1$ ion; $M^2$ is a transition metal; A represents an anion; b, c and d are numbers that reflect an electrostatically neutral complex; r is from 4 to 6; t is from 0 to 2; x and y are integers that balance the charges in the metal salt $M^3_xA_y$, and n is zero or a positive integer. The foregoing formula does not reflect the presence of neutral complexing agents such as t-butanol which are often present in the DMC catalyst complex.

An especially preferred type of DMC catalyst includes a zinc hexacyanocobaltate, particularly a zinc hexacyanocobaltate complexed with t-butanol.

Enough of the catalyst is used to provide a reasonable polymerization rate. Basic catalysts are generally used in an amount in the range of 0.01 to 1.5 moles per equivalent of oxyalkylatable groups in the initiator composition. The amount of DMC catalyst may be enough to provide 1 to 200 parts by weight of the transition metal(s) ($M^1$ and $M^2$ in the foregoing formula) per million parts by weight of the polyether product (ppm).

The initiator composition may include certain metal promoter compounds, such as those described in WO 2012/091968 as "MG3-15LA compounds", especially when the alkylene oxide polymerization catalyst is a DMC type. An MG3-15LA compound as described in WO 2012/091968 is a separately added ingredient, which is not present during the preparation (i.e., the precipitation step) of the DMC catalyst complex. The MG3-15LA compound contains a magnesium, Group 3-Group 15 metal or lanthanide series metal ion bonded to at least one alkoxide, aryloxy, carboxylate, acyl, pyrophosphate, phosphate, thiophosphate, dithiophosphate, phosphate ester, thiophosphate ester, amide, siloxide, hydride, carbamate or hydrocarbon anion. The MG3-15LA compound is devoid of halide anions. The MG3-15LA compound tends to decrease the time needed to activate the DMC catalyst complex, often greatly accelerates the polymerization rate, and can permit the use of smaller quantities of the DMC catalyst.

If used, enough of the MG3-15LA compound is present to provide at least 0.0005 moles of the magnesium, group 3-group 15 metal or lanthanide series metal per gram of the DMC catalyst complex. A preferred amount is enough to provide at least 1 mole, preferably at least 5 moles, up to 50 moles, preferably up to 20 moles, of the group 3-group 15 metal or lanthanide series metal per mole of the M metal in the DMC catalyst complex.

When the polymerization is performed in multiple monomer feed sections of a tubular reactor, the alkylene oxide polymerization catalyst may be the same in each section. Alternatively, different polymerization catalysts may be used in different monomer feed sections of the tubular reactor.

In a specific example, a DMC catalyst complex is the alkylene oxide polymerization catalyst in one or more upstream monomer feed sections, and a strong base catalyst such as an alkali metal hydroxide is the alkylene oxide polymerization catalyst in one or more downstream sections. This is a convenient way of preparing ethylene oxide-capped poly(propylene oxide)s. In the upstream monomer feed section(s), 1,2-propylene oxide by itself or as a mixture of 50-99.9 weight-% 1,2-propylene oxide and correspondingly 0.1 to 50 weight percent ethylene oxide is introduced through ports 4 and polymerized in the presence of the DMC catalyst. Because the DMC catalyst performs poorly when homopolymerizing ethylene oxide, in one or more subsequent monomer feed sections, ethylene oxide by itself or as a mixture of greater than 50 weight percent ethylene oxide and correspondingly less than 50 weight-percent 1,2-propylene oxide is introduced through ports 4 and polymerized in the presence of the basic catalyst.

The basic catalyst is introduced in such subsequent monomer feed section(s) or in an intermediate section following the upstream monomer feed section(s) where the DMC-catalyzed polymerization takes place and before the subsequent monomer feed sections where the basic catalyzed polymerization occurs. The addition of the basic catalyst deactivates the DMC catalyst, so polymerization occurring at or downstream of the point of addition of basic catalyst is an anionic, base-catalyzed one rather than a DMC catalyzed reaction. This process permits the preparation of ethylene oxide-capped poly(propylene oxide)s in a single continuous process.

The initiator composition may contain a diluent, which for purposes of this invention is an added material that dilutes the concentration of hydroxyl groups in the composition (relative to the concentration of hydroxyl groups in the initiator by itself). Such a diluent in some cases increases the mass introduced at the inlet end of the tubular reactor, which may be needed to achieve plug flow conditions and minimize or eliminate back-mixing in the tubular reactor.

A diluent also serves to reduce the concentration of hydroxyl groups in the initiator, which may be important to efficient operation. DMC catalysts, for example, often perform sluggishly in the presence of high concentrations of hydroxyl groups. By reducing the hydroxyl group concentration, the presence of a diluent in such a case can lead to faster activation of the catalyst and faster polymerization rates during at least early stages of the polymerization.

The diluent can be an inert material that is unreactive with the other components of the reaction mixture in the tubular reactor. Given the differential catalytic activity of DMC, that is, its tendency to polymerize first the lower molecular polyols, a preferred diluent is a polyether having a molecular weight greater than the initiator, up to that of the polyether product formed in the tubular reactor. Conveniently, a portion of the product from any monomer feed section of the tubular reactor, or from the outlet end of the tubular reactor, can be recycled back into the process as part of the initiator composition.

Such a recycling method is shown in FIG. 5. In FIG. 5, a portion of the reaction mixture is withdrawn from digestion portion 22 of tubular reactor 1 through line 24, and is recycled back into preliminary section 21, where it becomes mixed with other ingredients of the initiator composition. The reaction mixture withdrawn via line 24 contains a partially or completely polymerized product having a greater molecular weight than the initiator compound. The recycled material may have a molecular weight, for example of 2 to 100 times that of the initiator compound and, for example, 5 to 100% of that of the final product of the polymerization process. The recycled material preferably has a URO level of less than 0.5 weight percent.

It is preferred to use enough of a diluent (if necessary) such that the initiator composition contains no more than 12% by weight, more preferably no more than 10% or no more than 8% by weight hydroxyl groups.

The product is a polyether having a nominal functionality equal to the functionality (i.e., number of oxyalkylatable groups) of the initiator compound(s). Its molecular weight is greater than that of the initiator compound(s), and may be, for example, 1.2 to 100 times, 2 to 100 times or 5 to 100 times that of the initiator compound(s). The number average molecular weight of the product may be, for example, at least 200, at least 500, at least 700, at least 1000, at least 1200 or at least 1500, and may be, for example up to 10,000, up to 8,000, up to 6000 or up to 5000.

The products of the process are useful in the same manner as polyethers made in conventional alkylene oxide polymerization processes. Among these uses are as raw materials for making reaction polymers; as surfactants; as thermal fluids; and as hydraulic fluids such as brake fluids.

Reaction polymers made from the polyether products produced in accordance with the invention include those known in the art generally as "polyurethanes". These include polymers having urethane groups formed in the reaction of the hydroxyl groups of the polyol mixture with isocyanate groups, and may contain other groups formed in the reaction of isocyanate groups. The reaction may be performed in the presence of a blowing agent, which may be a physical (endothermic) type or a chemical (exothermic) type such as water or other compound that generates carbon dioxide or nitrogen under the conditions of the curing reaction. The reaction polymer may be, for example, a non-cellular elastomer, a microcellular elastomer, a flexible foam, a semi-flexible foam, a rigid foam, or a thermoplastic. The reaction polymer may be, for example, an adhesive, a sealant, a gasket, a dynamic elastomer, a thermal insulating foam, a cushioning foam, a structural foam or an injection-molded article. The reaction particle may be reinforced with fibers or other reinforcements.

The following examples are provided to illustrate the invention but are not intended to limit the scope thereof. All parts and percentages are by weight unless otherwise indicated.

EXAMPLE 1

An alkylene polymerization is performed in a tubular reactor 200 meters in length. The ports are designed so the alkylene oxides can be selectively fed through them, so that the alkylene oxides can be fed into predetermined places along the length of the reactor.

In this example, 1,2-propylene oxide is fed only into the first 50 meters of the tubular reactor, which form a first monomer feed section. In this first monomer feed section, the 1,2-propylene oxide is polymerized onto an initiator to form a poly(propylene oxide) intermediate. Ethylene oxide is introduced in the next 104 meters of the tubular reactor, which constitute a second monomer feed section in which ethylene oxide is polymerized onto the intermediate formed in the first monomer feed section. Each monomer feed section is arbitrarily divided into 100 portions for purposes of comparing molecular weight, URO and flow rates along the length of each of the monomer feed sections. No alkylene oxide is introduced into the next 46 meters of the tubular reactor, and so this section of the reactor constitutes a digestion zone which is not cooled.

The tubular reactor has a tube-in-tube structure as shown in FIG. 3, with an innermost alkylene oxide supply tube surrounded by a larger tube that encloses the reaction zone and a third, still larger tube through which a thermal fluid flows. The reaction zone has an outer diameter of 60 cm, an inner diameter of 10 cm, and a cross-sectional area of about 0.25 $m^2$.

Alkylene oxide is introduced into each of the monomer feed sections via small holes through the innermost tube. The holes in each of the monomer feed sections are each the same size and the flow rate of alkylene oxide through each of the holes in each reaction zone is approximately the same. In each of the monomer feed sections, the flow rate of alkylene oxide increases along its length as indicated in FIG. 6 below. The number of holes increases along the length of each of the monomer feed sections in proportion to the increase in the flow rate of alkylene oxide along the length of that monomer feed section.

The initiator composition introduced into the inlet end of the tubular reactor includes dipropylene glycol as the initiator, a DMC catalyst complex and 2 parts by weight of a polyether corresponding to the product per part by weight of the initiator. The hydroxyl content of the initiator composition is approximately 16% by weight. The product is an ethylene oxide-capped poly(propylene oxide) diol having a number average molecular weight of about 1850, which contains 28% by weight polymerized ethylene oxide in the form of terminal blocks. The average length of the poly (propylene oxide) chains is about 630 g/mol, and the length of the poly(ethylene oxide) end-caps is about 260 g/mol.

Steady-state conditions are established by starting flows of the initiator composition and alkylene oxides until a temperature of 160° C. is achieved in the monomer feed sections. The cooling fluid temperature is 130-140° C. Upon establishment of steady-state conditions, the initiator composition is fed into the inlet end of the tubular reactor at a rate such that the residence time in the first monomer feed section is 409 minutes.

Figure 9:
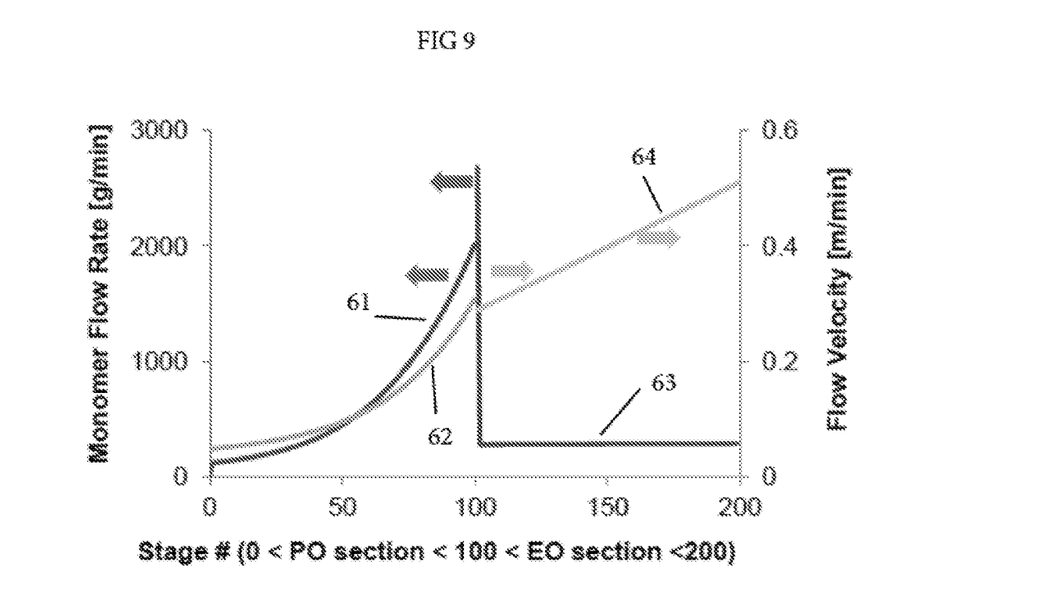
FIG. 9 is a graphical representation showing monomer introduction rates and reaction mixture flow rates in a representative process of the invention.
Figure 10:
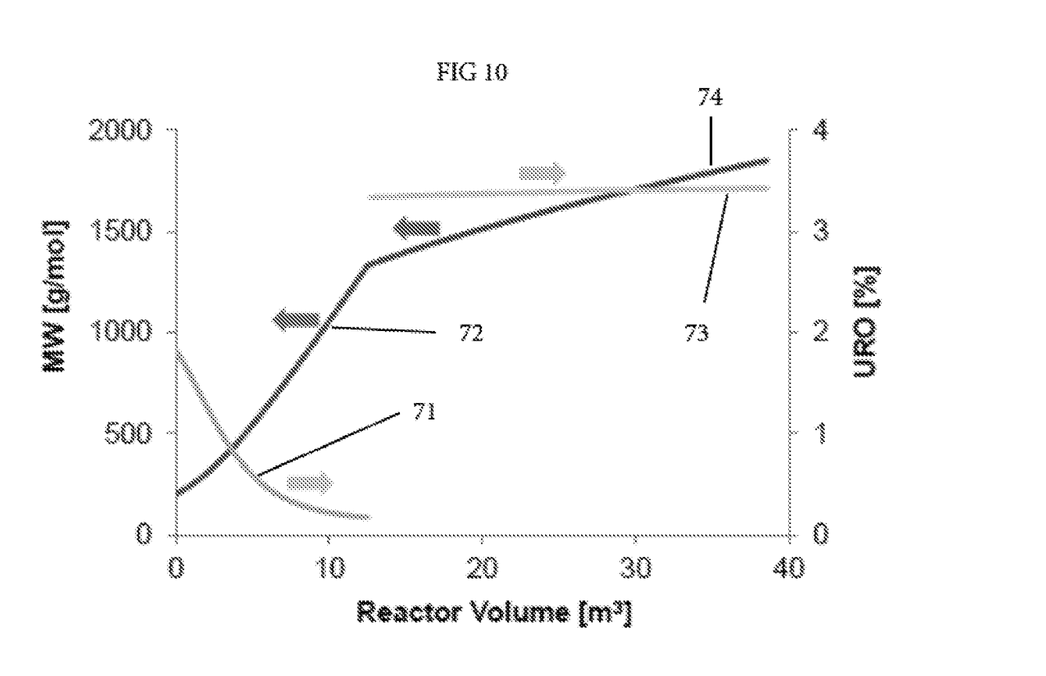
FIG. 10 is a graphical representation showing molecular weight and unreacted oxide concentration as a function of the position of the reaction mixture in a tubular reactor operated in accordance with this invention.

Propylene oxide is continuously fed into the first monomer feed section at an increasing rate along its length, as indicated by line 61 in FIG. 9. This results in a continuously increasing flow rate through the first monomer feed section, as indicated by line 62 of FIG. 9. Under these conditions of temperature and flow rate, the URO at the beginning of the first monomer feed section is approximately 2%, and gradually decreases to about 0.25% at the end of the first monomer feed section, as indicated by line 71 in FIG. 10. The overall average URO is about 1%. Molecular weight increases along the length of the first monomer feed section as indicated by line 72 of FIG. 10. In FIG. 10, the x-axis represents cumulative reactor volume as the reaction mixture passes through the tubular reactor. The cumulative volume at any point is equal to the reactor cross-sectional area times the distance from the inlet end.

At the beginning of the second monomer feed section, potassium hydroxide is introduced. This deactivates the DMC catalyst. A large amount of ethylene oxide is also introduced at the start of the second monomer feed section, to increase the URO to about 3.7%. Ethylene oxide is then fed through ports along the length of the second monomer feed section to maintain the URO essentially constant, as shown by line 73 of FIG. 10. The rate of ethylene oxide addition is essentially constant along the length of the second monomer feed section, as indicated by line 63 of FIG. 9. The URO is maintained at about 3.4% along the length of the second monomer feed section. The flow rate again increases along the length of the second monomer feed section, as indicated by line 64 of FIG. 9. The increase in molecular weight along the length of the second monomer feed section is indicated by line 74 of FIG. 10.

The residence time in the second monomer feed section is 260 minutes.

Cooling costs are estimated as 1.12 in arbitrary units that depend on an assumed electricity cost. The estimated cooling cost for producing an equivalent product in a continuous stirred tank reactor is about 1.70 in the same units. The invention permits a reduction in cooling costs of about one-third. The estimated cycle time to produce the product in a continuous stirred tank reactor is approximately double the residence time of the tubular reactor.

EXAMPLES 2-4

Examples 2-4 illustrate the production of three different polyether polyols in the tubular reactor described in Example 1. The different products are made via selecting the initiator compound, flow rates, residence times and alkylene oxides.

For Example 2, the initiator is glycerin and the product is a 700 molecular weight poly(propylene oxide). The initiator composition contains 2 parts of product per part of glycerin. The catalyst is a DMC catalyst complex. Alkylene oxide is fed into the first 95 meters of the tubular reactor, which constitute the monomer feed section. The remaining length of the reactor serves as a digestion zone and is not cooled. The URO along the entire length of the monomer feed section is maintained between about 0.25 and 3.77%, with an average of 2.6%. The residence time through the monomer feed section is 382 minutes. The estimated cooling cost in the same arbitrary units as in Example 1 is 0.56. To produce the same product in a continuous stirred tank reactor would require an estimated cycle time of 810 minutes and a cooling cost of 1.35 in the same arbitrary units. The savings in estimated cooling costs is about 58%.

For Example 3, the initiator is dipropylene glycol, and the product is a 4000 molecular weight poly(propylene oxide). The initiator composition contains 2 parts of product per part of initiator compound. The catalyst is a DMC catalyst complex. Alkylene oxide is fed into the first 64 meters of the tubular reactor, which constitute the monomer feed section. The remaining length of the reactor serves as a digestion zone, and is not cooled. The URO along the entire length of the monomer feed section is maintained between about 0.25 and 3.5%, with an average of 0.64%. The residence time through the monomer feed section is 533 minutes. The estimated cooling cost in the same arbitrary units as in Example 1 is 0.80. To produce the same product in a continuous stirred tank reactor would require an estimated cycle time of 1112 minutes and a cooling cost of 1.52 in the same arbitrary units. The savings in estimated cooling costs is about 47%.

For Example 4, the initiator is glycerin, and the product is a 4800 molecular weight ethylene oxide-capped poly(propylene oxide) containing 14% polymerized ethylene oxide. The initiator composition contains 2 parts of product per part of glycerin. The catalyst is a DMC catalyst complex.

The first 46 meters of the tubular reactor constitute a first monomer feed section in which 1,2-propylene oxide is fed and polymerized. The next 49 meters of the tubular reactor constitute a second monomer feed section in which ethylene oxide is fed and polymerized. The remaining length of the tubular reactor is a digestion zone which is not cooled.

The URO along the entire length of the first monomer feed section is maintained between about 0.25 and 3.8%, with an average of 1.1 weight-%. The residence time through the first monomer feed section is 568 minutes.

The URO along the entire length of the second monomer feed section is maintained between about 3% and 3.7%, with an average of about 3.6%. The residence time in the second monomer feed section is 260 minutes.

The estimated cooling cost in the same arbitrary units as in Example 1 is 0.80. To produce the same product in a continuous stirred tank reactor would require an estimated cycle time of 1249 minutes and a cooling cost of 1.62 in the same arbitrary units. The savings in estimated cooling costs is about 50%.

What is claimed is:

1. A process for manufacturing a polyether by polymerizing at least one alkylene oxide in a tubular reactor having an inlet end and an outlet end, wherein an initiator composition containing at least one initiator compound and an alkylene oxide polymerization catalyst is continuously introduced into said inlet end and the polyether is continuously removed from the outlet end, wherein the tubular reactor includes at least one monomer feed section wherein at least one alkylene oxide is continuously introduced under polymerization conditions through multiple alkylene oxide ports arranged along the length of said monomer feed section to form a reaction mixture, the process being further characterized in that the concentration of unreacted alkylene oxide is maintained in the range 0.1 to 12 weight percent at each point along the length of the monomer feed section.

2. The process of claim 1, wherein the rate of addition of the alkylene oxide per unit length of the monomer feed section increases along the length of the monomer feed section in a downstream direction.

3. The process of claim 1, wherein the number of alkylene oxide injection ports in the monomer feed section is at least 50.

4. The process of any of claim 1, wherein the tubular reactor is separated from a reservoir of the alkylene oxide by a semi-permeable membrane, and the alkylene oxide is introduced into the tubular reactor by passing through the semi-permeable membrane.

5. The process of claim 2, wherein the tubular reactor is disposed in a shell, and heat of reaction is removed from the tubular reactor by passing a thermal fluid through the shell and in contact with an exterior surface of the tubular reactor.

6. The process of claim 2, wherein the tubular reactor includes at least two monomer feed sections arranged sequentially along the length of the tubular reactor, wherein the composition of the alkylene oxide is different in one monomer feed section than in at least one other monomer feed section.

7. The process of claim 2 wherein the tubular reactor includes a digestion section downstream of at least one monomer feed section, wherein polymerization conditions are maintained in said digestion section and no alkylene oxide is introduced into said digestion section.

8. The process of claim 2 wherein the tubular reactor includes a catalyst activation section upstream of at least one monomer feed section.

9. The process of claim 2 wherein the initiator composition includes an intermediate polyether product formed by polymerizing at least one alkylene oxide in an upstream batch reactor or continuous stirred tank reactor, and the intermediate polyether product is fed into an inlet end of the tubular reactor from the upstream batch reactor or continuous stirred tank reactor.

10. The process of claim 2 which includes a step of recycling a portion of the polyether into the inlet end of the tubular reactor as a component of the initiator composition.

11. The process of claim 2 wherein the initiator composition contains up to 12 weight-percent hydroxyl groups.

12. The process of claim 2, wherein the temperature in the monomer feed section is 130 to 170° C.

* * * * *